US012765725B2

(12) United States Patent
Schwam

(10) Patent No.: US 12,765,725 B2
(45) Date of Patent: Oct. 20, 2026

(54) COLLAPSIBLE HEAT SHIELD

(71) Applicant: Julie Rachel Schwam, Coeur d'Alene, ID (US)

(72) Inventor: Julianna Rose Schwam, Coeur d'Alene, ID (US)

(73) Assignee: Julie Rachel Schwam, Coeur d'Alene (ID)

( * ) Notice: Subject to any disclaimer, the term of this patent is extended or adjusted under 35 U.S.C. 154(b) by 756 days.

(21) Appl. No.: 18/315,235

(22) Filed: May 10, 2023

(65) Prior Publication Data

US 2023/0363589 A1 Nov. 16, 2023

Related U.S. Application Data

(60) Provisional application No. 63/340,387, filed on May 10, 2022.

(51) Int. Cl.
*A47J 43/18* (2006.01)

(52) U.S. Cl.
CPC .................................... *A47J 43/18* (2013.01)

(58) Field of Classification Search
CPC ........ A47J 37/041; A47J 43/18; A47J 37/049; A47J 37/0786; A47J 43/283; A47J 37/0694; A47J 37/043; A47J 43/20; A47J 33/00; A47J 37/04; A47J 37/047; A47J 37/0652; A47J 37/0704; A47J 37/0718; A47J 37/0745; A47J 37/0763; A47J 37/0772; A47J 43/28; A47J 45/10
USPC ......... 99/419, 427, 339, 448, 449, 441, 446, 99/340, 341, 345, 351, 352, 357, 420, 99/445
See application file for complete search history.

(56) References Cited

U.S. PATENT DOCUMENTS 2,317,388 A * 4/1943 Lako, Jr. ............. A47J 37/0694 99/441
4,176,592 A * 12/1979 Doyle, Jr. ........... A47J 37/0694 99/421 A
4,369,697 A * 1/1983 Millington ............ A47J 37/041 99/449
5,193,443 A * 3/1993 Carney ............... A47J 37/0786 99/449
5,619,909 A * 4/1997 Volk ........................ A47J 43/18 99/421 H
6,286,418 B1 * 9/2001 Berke ..................... A47J 43/18 99/421 A
6,347,577 B1 * 2/2002 Harneit ................. A47J 37/047 99/449

(Continued)

*Primary Examiner* — Chris Q Liu
(74) *Attorney, Agent, or Firm* — Lee & Hayes, P.C.

(57) ABSTRACT

This disclosure is directed toward a collapsible heat and/or fire shield (referred to herein as a "collapsible shield"). In some examples, the collapsible shield may protect a user from heat, fire, and/or sparks when the user engages in activities (e.g., roasting food, moving wood/coals, etc.) proximate a fire. In some examples, the collapsible shield may include a rod which may include a handle on one end, and one or more prongs on a second end. A user may utilize the handle to maneuver the rod about a fire. Further, a canopy may encircle the rod between the handle and the prongs. The canopy may be configured to expand into a dome-shaped barrier, and collapse so that the canopy lay substantially flat, proximate the rod.

15 Claims, 4 Drawing Sheets

(56) References Cited

U.S. PATENT DOCUMENTS

| | | | | |
|---|---|---|---|---|
| 7,347,197 | B2 * | 3/2008 | Hankinson .......... | A47J 37/0772<br>126/30 |
| 10,398,259 | B1 * | 9/2019 | Hetherington ........ | A47J 37/041 |
| 2005/0275231 | A1 * | 12/2005 | Settele .................... | A47J 43/28<br>294/61 |
| 2007/0079709 | A1 * | 4/2007 | Giblin ..................... | A47J 43/18<br>99/419 |
| 2008/0135038 | A1 * | 6/2008 | Michel ................ | A47J 37/0718<br>126/25 A |
| 2013/0087177 | A1 * | 4/2013 | Muinde .................. | A45B 25/20<br>135/25.4 |
| 2014/0338545 | A1 * | 11/2014 | Ramadan .............. | A47J 37/049<br>99/445 |

* cited by examiner

COLLAPSIBLE HEAT SHIELD

RELATED APPLICATIONS

This application claims priority to U.S. Provisional Patent Application No. 63/340,387, filed May 10, 2022. The contents of which are incorporated herein in their entirety.

BACKGROUND

Outdoor activities are becoming increasingly more popular for family and friends alike to facilitate relaxing, fun-filled experiences. For example, many people enjoy activities such as camping, barbeques, or roasting smores over an open fire. Such activities welcome participants of all ages and with varying levels of health.

In some instances, people may cook over an open fire (e.g., a campfire, a fire pit, etc.) in roasting marshmallows, hot dogs, or other foods or snacks. To roast such objects, a roasting skewer/pole may be used. Traditional roasting skewers may include a long rod with multiple prongs on the end, upon which users insert the desired food to roast.

Some people may desire to engage in such activities though they are short in stature and/or disabled. Such people may be required to position themselves closer to the open fire in order to properly maneuver the roasting skewer to an effective position for roasting with respect to the fire. However, getting too close to an open fire can cause a user to get burned and/or cause medical equipment to get excessively hot and/or melt. Further, increasing the length of a skewer to increase the distance between user and fire may cause the skewer to bend excessively.

BRIEF DESCRIPTION OF DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing a schematic depiction of the various components. However, the drawings are not necessarily to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
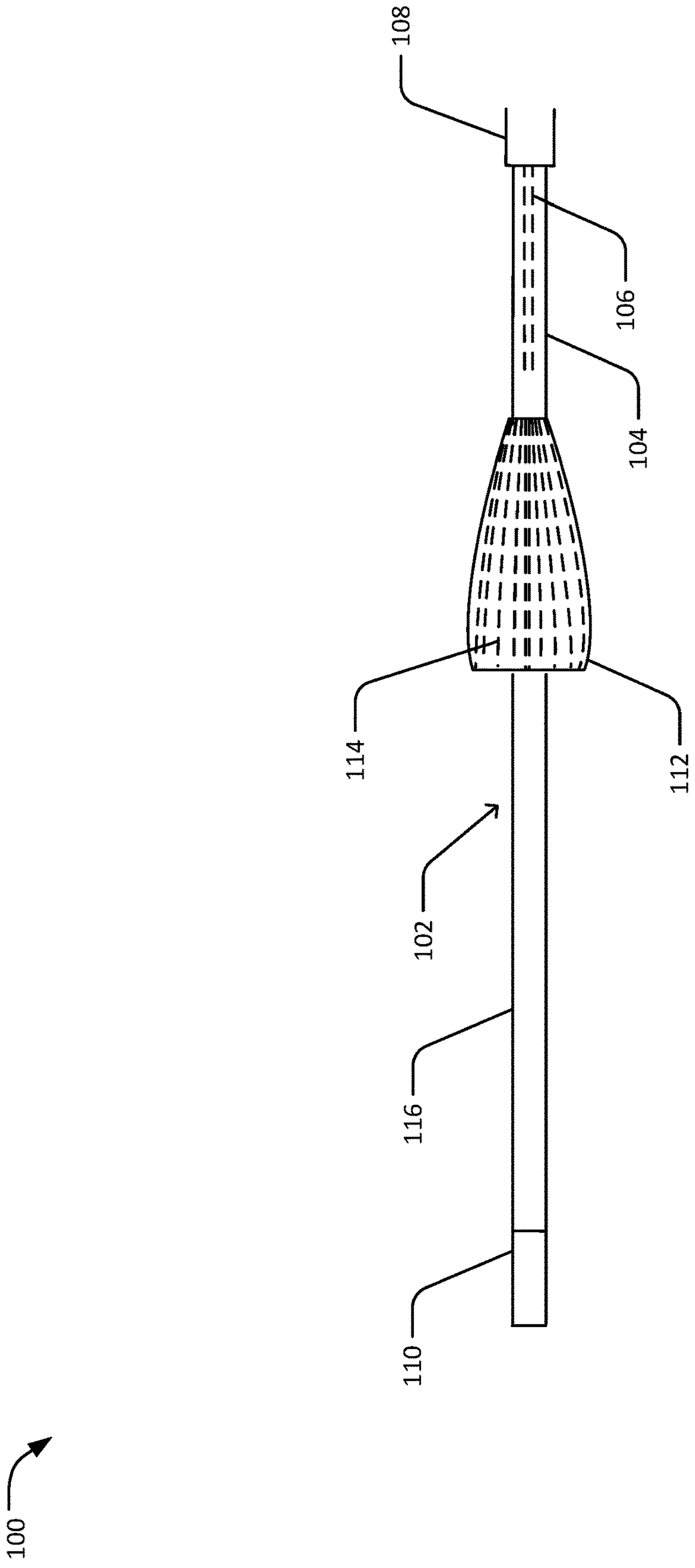
FIG. 1 illustrates a side view of an example collapsible heat shield in a collapsed state.

This disclosure is directed toward a collapsible heat and/or fire shield (alternatively referred to herein as a “collapsible shield”). In some examples, the collapsible shield comprises a barrier to protect a user from heat, fire, and/or sparks when the user engages in activities (e.g., roasting food, moving wood/coals, etc.) proximate a fire. In some examples, the collapsible shield may include comprise a rod, a canopy, a which may include a handle on at a first end of the rod, and one or more prongs on at a second end of the rod. A user may utilize the handle to maneuver the collapsible shield about a fire. Further, the rod may include a canopy located between the handle and the prongs. In examples, The canopy may be configured to expand into a dome shaped barrier, and collapse so that the canopy lay substantially flat, proximate the rod.

As discussed above, users may engage in activities proximate an open fire. Activities such as roasting food and/or moving objects (e.g., coals, wood, etc.) within a fire may require a user to move close to the fire. In some examples, users may be disabled and/or small, which may cause them to be positioned too close to the fire. In such examples, users may try to use a longer roasting rod to maintain proper distance. However, such user may be unable to engage with, and control, a larger roasting rod as the weight of the roasting rod may be too great. Thus, such users, when engaging in roasting food from a fire, may be subject to excessive heat and/or burns produced from the fire. Additionally, the fire may damage and/or destroy equipment for disabled users, in addition to subjecting users wearing flammable clothing to danger (e.g., clothing may catch fire).

This application describes a collapsible shield configured to be held by a user and protect from heat, fire, and/or sparks when the user engages in roasting food and/or moving objects in a fire. In some examples, a collapsible shield may include a rod with a first end and a second end. The rod may be made from any type of metal, or any like material. Further, the rod may range in length (e.g., from about 1 foot to about 7 feet, from about 2 feet to about 6 feet, from about 3 feet to about 5 feet, etc.) and in examples may be lengthened or shortened using telescoping extenders. In some examples, the rod may be hollow; in other examples, the rod may be solid. In yet other examples, the rod may include some portions that may be hollow and other portions that may be solid.

In some examples, the rod may include a first portion and a second portion. In some examples, the first portion and the second portion taken together may comprise a single rod that extends from a handle on a first end of the rod to one or more prongs on a second end of the rod. In examples, the first portion and the second portion are separate components adjoined to form a rod. In examples, the first portion of the rod may comprise a first rod affixed to a handle and the second portion of the rod may comprise a second rod affixed to one or more prongs. In examples, the first portion, the second portion, or both portions may include telescoping extenders. The one or more telescoping extenders may be configured to extend the length of the rod or a portion of the rod, enabling the user to remain at a safe distance from the fire while still being close enough to roast food on the fire.

In some examples, the collapsible shield may include one or more prongs coupled to or comprising the second end of the rod. In some examples, the collapsible shield may include a single rod which includes a pronged second end. In some examples, the prongs may be configured to engage with or manipulate food (e.g., hot dogs, bread, marshmallows, apples, etc.) or other objects (e.g., wood/coals, etc.) within a fire. The prongs may be substantially U-shaped, cross-shaped, or any other like shape.

In some examples, the collapsible shield may include a handle coupled to or comprising the first end of the rod. In some examples, the handle may be made from one or more of plastic, wood, metal, fabric, or any other like material. The handle may be configured to be curved, straight, cross-shaped, t-shaped, or any other like shape. In some examples, a user may engage with the handle in order to maneuver the rod about the fire. In some examples, the handle may include one or more parts configured to rotate one or more prongs attached to or comprising the second end of the rod.

In some examples, the collapsible shield may include a protective canopy configured to block heat, fire, and/or sparks from a user. In some examples, the canopy may be configured to expand into a dome shape. In some examples, the canopy may comprise a cover made from at least one of one or more thermal resistant materials, one or more fire resistant materials, one or more fire retardant materials, or any other like material. In some examples, the canopy may be a substantially semicircular shape to allow a user to see the prongs while the prongs are proximate the fire. However, this is not intended to be limiting, and the canopy may alternatively be substantially circular in shape or any other shape that could be extended from the rod (e.g., oblong, rectangular, square, oval, etc.). In examples, the canopy may be configured to be adjusted from a circular to a semicircular shape or from a semicircular shape to a circular shape.

In some examples, the rod is configured to extend through substantially the center of the canopy.

In some examples, the canopy may be expandable and/or collapsible. The canopy may be supported by one or more support ribs that extend outward from the rod at least a portion of a distance from the center of the canopy to the edge of the canopy. The support ribs enable the canopy to collapse so that the canopy lay substantially flat proximate the rod, and expand so that the canopy may form, in examples, the substantially dome, or concave shape.

In some examples, the collapsible shield may include a grip configured to slide along the rod to expand or collapse the canopy. In examples, one or more rib braces may be coupled to the grip and also to the support ribs. A user may utilize the grip to expand and/or collapse the canopy by sliding the grip along the rod.

As illustrated by these examples, the innovation described herein can improve the functionality, safety, ease, and overall user experience of a user roasting food around a fire by providing a collapsible shield positioned between the user and the fire. As described above, the collapsible shield enables all users—including those with disabilities and those who must position themselves closer to the fire to reach it—to maintain protection from the heat and/or sparks from the fire.

FIG. 1 illustrates a side view of an example collapsible shield 100 in a collapsed state. In some examples, the example collapsible shield ("collapsible shield") 100 includes a rod 102. As illustrated in FIG. 1, the rod 102 may comprise a first portion 116 and a second portion 104. In some examples, the rod 102 may extend from a handle 110 on a first end to one or more prongs 108 on a second end. In some examples, the rod 102 may include one or more telescoping extenders 106 as part of the first portion 116 or the second portion 104 or both, configured to alter the length of the rod 102. As shown in FIG. 1, a telescoping extender 106 may be surrounded by rod 102. In some examples, second portion 104 may be configured to house telescoping extender(s) 106. In some examples, a user may extend the telescoping extender(s) 106 so that telescoping extender(s) 106 slides outside of second portion 104. In some examples, the first portion 116 and the second portion 104 may be a single rod. In examples, the second portion 104 may be housed within the first portion 116 and may be extended by a user to extend the length of the overall rod 102. Though this example illustrates and one telescoping extender(s) 106 inside second portion 104, in alternative examples there may be more telescopic rods housed first portion 116, or within second portion 104, and/or within telescoping extender(s) 106. Alternatively, in embodiments (not shown), the collapsible shield may not include a telescoping feature.

In some examples, the collapsible shield 100 may include one or more prongs 108 which may be coupled to, and extend from, the second portion 104, or telescoping extender (s) 106. In some examples, when the collapsible shield 100 includes one or more telescoping extender(s) 106, the prong (s) 108 may be coupled to the innermost telescoping extenders (e.g., in this case telescoping extender 106). In some examples, the collapsible shield 100 may not include telescoping extenders. In such examples, the first portion 116 and the second portion 104 may comprise a single rod 102 and the prongs may be coupled to, or built into, the end of the rod 102. Though in this example there are two prongs, it can be appreciated that is alternative examples the collapsible shield 100 may include more, or fewer prongs 108.

In some examples, the collapsible shield 100 may include a handle 110 configured to engage the hand of a user. In examples, the handle 110 may be attached to the first end of the rod 102. A user may utilize the handle 110 to maneuver the collapsible shield 100 about a fire. Though illustrated in FIG. 1 as a straight handle, it can be appreciated that alternative handle shapes may be used (e.g., curved, U-shaped, cross-shaped, etc.).

In some examples, the collapsible shield 100 may include a canopy 112 configured to block heat, fire, and/or sparks from a user. In some examples, the canopy 112 may be made from at least one of one or more thermal resistant material, one or more fire resistant materials, one or more fire retardant materials, and/or any other like material. The canopy 112 may be located at any location between the handle 110 and the prong(s) 108 of the collapsible shield 100 and may be moveable along the length of rod 102. In some examples, it may be beneficial to locate the canopy 112 substantially in the middle of the handle 110 and the prong(s) 108. The canopy 112 is configured to encircle the rod 102. As shown, the canopy 112 may be collapsible which may enable a user to transport the collapsible shield 100 by using a protective case (not shown). The protective case may be designed to enable the collapsible shield 100 to fit inside the protective case when the collapsible shield 100 is in a collapsed state, as shown in FIG. 1. Additionally, the protective case may be configured to accommodate the various design alternatives of the collapsible shield 100. The canopy 112 may include a strap (not shown) that may encircle the canopy 112 when the collapsible shield 100 is in a collapsed state in order to keep the canopy 112 in a collapsed position. In some examples, the strap may attach to itself once the strap is wrapped around canopy 112 in order to keep the canopy 112 in a collapsed position In some examples, the collapsible shield 100 may include one or more support ribs 114 configured to support the canopy 112 when in an expanded state. The support rib(s) 114 may be configured to extend from the rod 102 at least a portion of the distance to the edge of the canopy 112. In examples, the support rib(s) 114 may comprise a single rib extending from the rod 102 to the edge of the canopy 112. In examples, the support ribs may be configured to maintain a canopy 112 that is substantially dome shaped when expanded, and the canopy 112 may collapse substantially flat when collapsed, as shown in FIG. 1.

Figure 2:
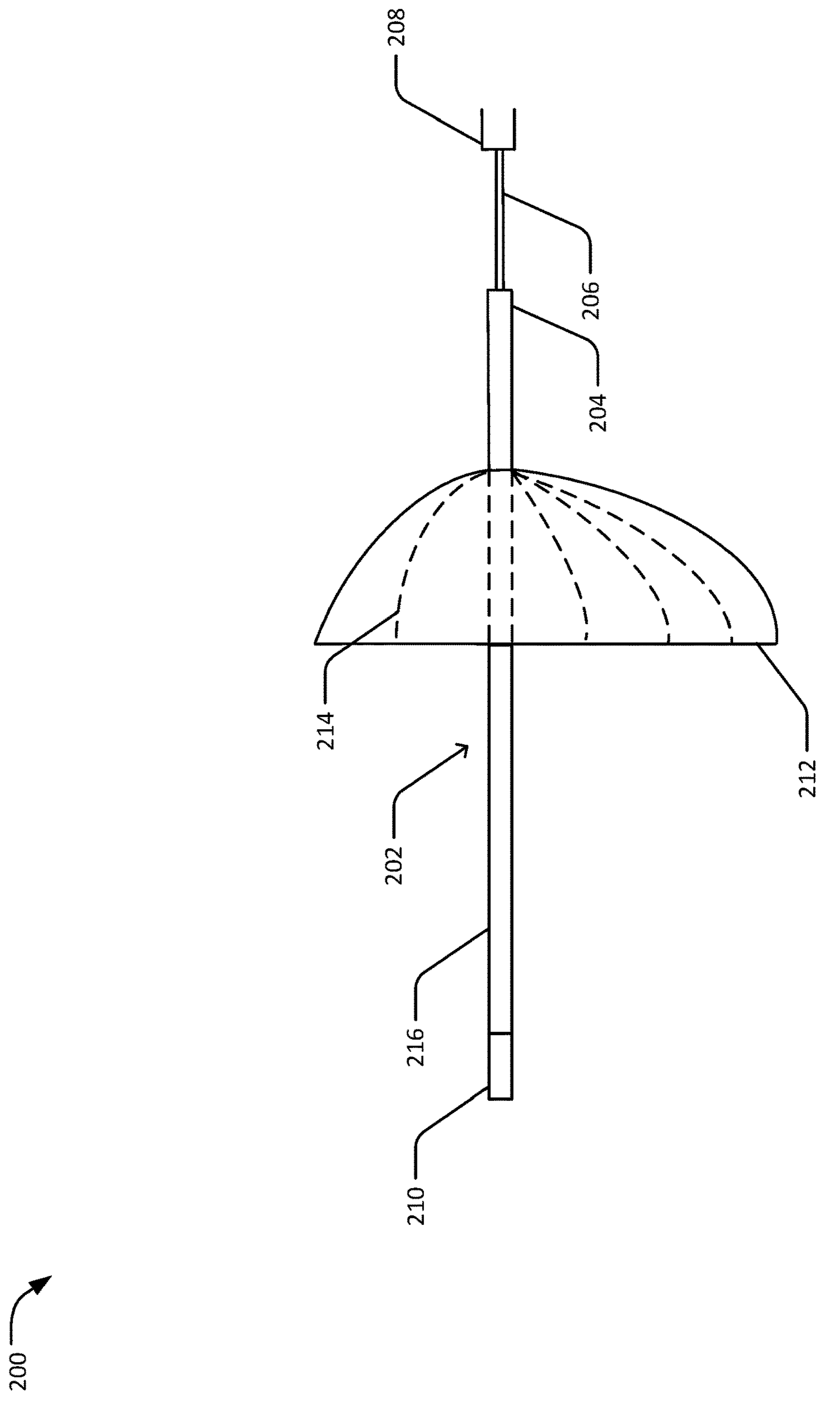
FIG. 2 illustrates a side view of an example collapsible heat shield in an expanded state.

FIG. 2 illustrates a side view of an example collapsible shield 200 in an expanded state. In some examples, the collapsible shield 200 may include a rod 202 (which can correspond to rod 102 of FIG. 1). Rod 202 may include a first portion 216 (which can correspond to first portion 116 of FIG. 1) and a second portion 204 (which can correspond to second portion 104 of FIG. 1). Rod 202 may comprise one or more telescoping extenders 206 (which can correspond to telescoping extenders 106 of FIG. 1). In FIG. 2, rod 202 is illustrated in an extended state.

In some examples, the second portion 204 or telescoping extender(s) 206 may include one or more prongs 208 (which can correspond to prong(s) 108 of FIG. 1) coupled to the end. Though illustrated in FIG. 2 to include two prongs, it is appreciated that the collapsible shield 200 may include additional, or fewer prongs. Additionally, the prongs 208 may be made in a variety of different shapes.

The collapsible shield 200 may include a handle 210 (which can correspond to handle 110 of FIG. 1) coupled to a first end of the rod 202 with which a user may engage to maneuver the collapsible shield 200.

In some examples, the collapsible shield 200 may include a canopy 212 (which can correspond to canopy 112 of FIG. 1), configured to block heat, fire, and/or sparks from a user engaging in roasting food in a fire. As illustrated, the canopy 212 may be configured to expand into a dome or concave shape when in expanded state. In some examples, the canopy 212 may be substantially circular in shape. In other examples, and as shown in FIG. 2, the canopy 212 may be made into a substantially semicircular shape. The semicircular shape on the upper portion of the canopy 212 enables a user to see over the canopy 212 which can allow the user to assess the roasting process and allow the user to see generally beyond the canopy 212.

As described above, the canopy 212 may include one or more support ribs 214 that may be configured to enable the canopy 212 to maintain a dome shape when in an expanded state, and a flat shape when in a collapsed state. Though FIG. 2 shows four support ribs 214, it is appreciated that alternative examples may include additional, or fewer support ribs 214 based on the size of the canopy, among other factors.

Figure 3:
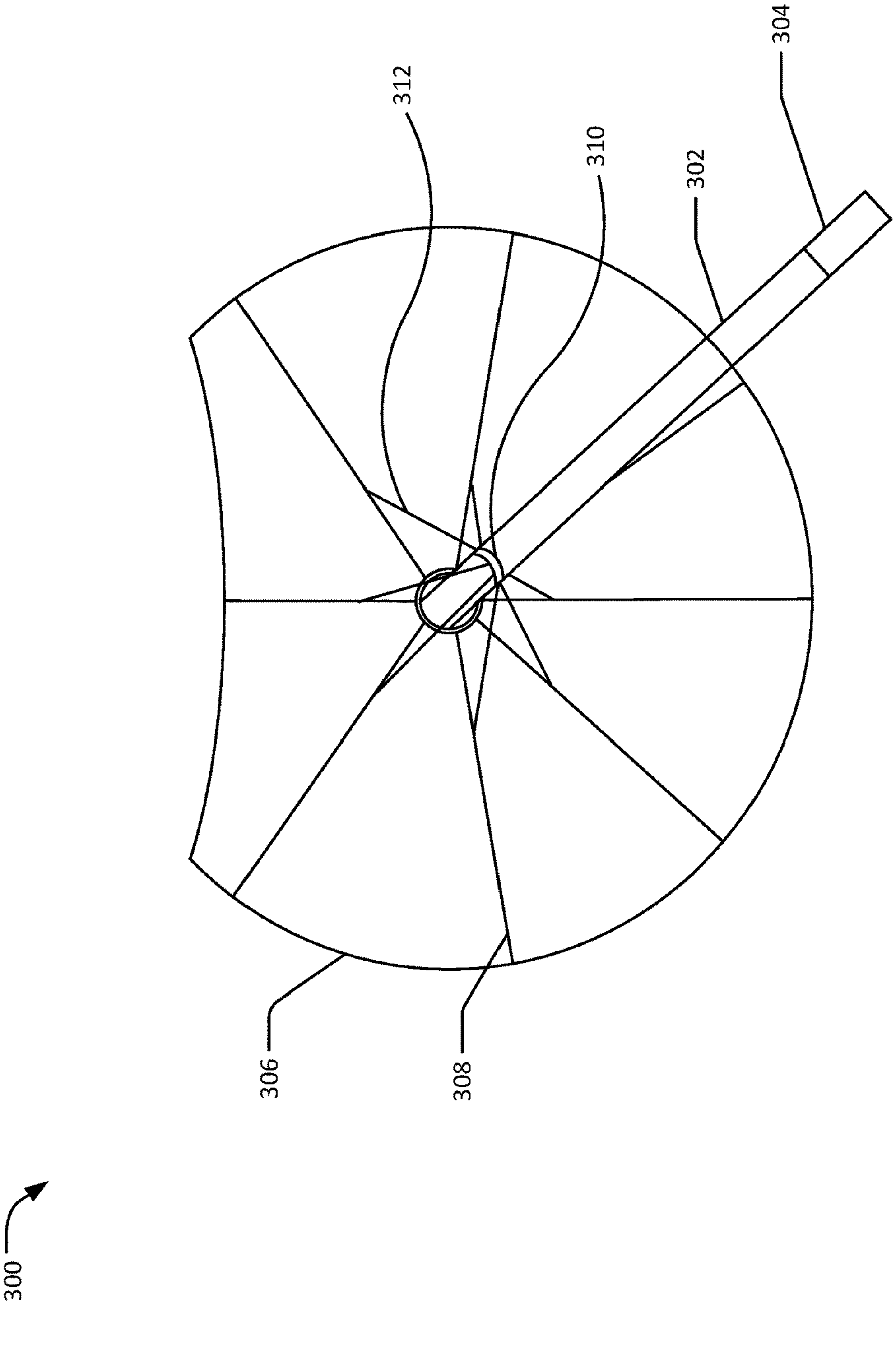
FIG. 3 illustrates a bottom view of an example collapsible heat shield in an expanded state.

FIG. 3 illustrates a bottom view of an example collapsible shield 300 in an expanded state. In some examples, the collapsible shield 300 may include a rod 302 (which can correspond to rod 102 of FIG. 1 or rod 202 of FIG. 2) which may include a handle 304 (which can correspond to rod 102 of FIG. 1 and rod 202 of FIG. 2) on a first end and one or more prongs on the second end. A user may engage with the handle 304 in order to maneuver the collapsible shield 300 about a fire while roasting food.

Collapsible shield 300 may also comprise a canopy 306 (which can correspond to canopy 112 of FIG. 1 or canopy 212 of FIG. 2). As illustrated, canopy 306 may be in an expanded state configured to block heat and/or fire from a user. The canopy 306 may be configured to be a substantially semicircular shape when in an expanded state enabling users to view over the canopy 306. As described above, it is appreciated that the canopy 306 may be circular, or any like shape.

In some examples, the canopy 306 may include one or more support ribs 308 (which can correspond to the support ribs 114 of FIG. 1 or the support ribs 214 of FIG. 2) configured to support the shape of the canopy 306 when in an expanded state. The support ribs(s) 308 may expand from the rod 302 at least a portion of the distance to the edge of the canopy 306. Though illustrated as including eight support ribs in FIG. 3, alternative examples may include additional or fewer support ribs 308.

In some examples, the collapsible shield 300 may include a grip 310 configured to slide along the rod 302 to expand and collapse the canopy 306. In such examples, one or more rib braces 312 may be coupled to the grip 310 and also to the support rib(s) 308. Accordingly, a user may slide the grip 310 to expand and/or collapse the canopy 306, and by sliding the grip 310 along the rod 302, the rib brace(s) 312 may be configured to cause the support rib(s) 308 to expand substantially perpendicular to the rod 302, or collapse flat against the rod 302.

Figure 4:
FIG. 4 illustrates an example environment for use of an example collapsible heat shield.

FIG. 4 illustrates an example environment 400 for use of an example collapsible heat shield. Environment 400 includes user 402 sitting proximate fire 406. In FIG. 4, the user 402 is illustrated as using a wheelchair. Medical equipment such as a wheelchair may be sensitive to heat and/or fire, which presents additional risk beyond a risk to the user themself. FIG. 4 illustrates the user 402 using collapsible shield 404 between the user 402 and the fire 406. In examples, the collapsible shield 404 may correspond to the collapsible shield 100 of FIG. 1, the collapsible shield 200 of FIG. 1, or the collapsible shield 300 of FIG. 3. The user 402 may be holding a first end of collapsible shield 404, though the holding itself is not explicitly illustrated in environment 400. Further, in examples, prongs of collapsible shield 404 may be attached to a food item (e.g., hot dog, marshmallow, etc.) being roasted in or near the fire 406, though no food item is illustrated in environment 400.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An apparatus comprising:

a rod having a first end and a second end opposite the first end, wherein the rod comprises a first portion and a second portion, and wherein the second portion is configured to be telescopic;

a handle coupled to the first end and configured to engage a hand of a user;

two or more prongs at the second end, wherein the two or more prongs are coupled to or comprise the second end; and a canopy coupled to the rod at a location between the first end and the second end, wherein the rod is configured to extend through a center of the canopy, wherein the canopy is configured to be collapsible, and wherein the canopy is configured to block at least one of heat or fire from the user.

2. The apparatus of claim 1, wherein the handle is straight, cross-shaped, or curved.

3. The apparatus of claim 1, wherein the handle comprises at least one of wood, metal, plastic, or fabric.

4. The apparatus of claim 1, wherein a portion of the handle is configured to rotate at least one of the two or more prongs.

5. The apparatus of claim 1, wherein the canopy comprises at least one of a thermal resistant material, a fire resistant material, or a fire retardant material.

6. The apparatus of claim 1, wherein at least one prong of the two or more prongs is U-shaped.

7. A fire roasting device comprising:

a rod having a first end and a second end opposite the first end, wherein the rod comprises a first portion and a second portion, and wherein the second portion is configured to be telescopic;

a handle coupled to the first end and configured to engage a hand of a user;

two or more prongs coupled to the second end; and a canopy coupled to the rod at a location between the first end and the second end, wherein the rod is configured to extend through a center of the canopy, wherein the canopy is configured to be collapsible, and wherein the canopy is configured to block at least one of heat or fire from the user.

8. The fire roasting device of claim 7, wherein a portion of the handle is configured to rotate at least one of the two or more prongs.

9. The fire roasting device of claim 7, wherein the handle is straight, cross-shaped, or curved.

10. The fire roasting device of claim 7, wherein the handle comprises at least one of wood, metal, plastic, or fabric.

11. The fire roasting device of claim 7, wherein at least one prong of the two or more prongs is U-shaped.

12. An apparatus comprising:

a rod having a first end and a second end, wherein the second end comprises two or more prongs opposite the first end, wherein the rod comprises a first portion and a second portion, and wherein the second portion is configured to be telescopic;

a handle coupled to the first end and configured to engage a hand of a user; and a canopy coupled to the rod at a location between the first end and the second end, wherein the rod is configured to extend through a center of the canopy, wherein the canopy is configured to be collapsible, and wherein the canopy is configured to block heat or fire from the user.

13. The apparatus of claim 12, wherein the handle is straight, cross-shaped, or curved.

14. The apparatus of claim 12, wherein the handle comprises at least one of wood, metal, plastic, or fabric.

15. The apparatus of claim 12, wherein at least one prong of the two or more prongs is U-shaped.

* * * * *